__ US009869192B2

(12) United States Patent
Duchaine

(10) Patent No.: US 9,869,192 B2
(45) Date of Patent: Jan. 16, 2018

(54) APPLICATION OF A CONNECTION JOINT TO A STATOR STAGE BY MEANS OF INFLATABLE BLADDERS

(71) Applicant: Techspace Aero S.A., Herstal (Milmort) (BE)

(72) Inventor: Georges Duchaine, Warsage (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 69 days.

(21) Appl. No.: 14/813,258

(22) Filed: Jul. 30, 2015

(65) Prior Publication Data
US 2016/0032743 A1 Feb. 4, 2016

(30) Foreign Application Priority Data

Jul. 31, 2014 (EP) ..................................... 14179301

(51) Int. Cl.
| F01D 9/04 | (2006.01) |
| B23P 15/00 | (2006.01) |
| B25B 5/06 | (2006.01) |
| F01D 25/28 | (2006.01) |
| B23P 19/04 | (2006.01) |
| B23Q 1/03 | (2006.01) |

(Continued)

(52) U.S. Cl.
CPC .............. *F01D 9/04* (2013.01); *B23P 15/006* (2013.01); *B23P 19/04* (2013.01); *B23Q 1/032* (2013.01); *B25B 5/065* (2013.01); *B29C 65/48* (2013.01); *F01D 5/005* (2013.01); *F01D 9/044* (2013.01); *F01D 25/285* (2013.01); *B29L 2031/7504* (2013.01); *F05D 2230/64* (2013.01)

(58) Field of Classification Search
None
See application file for complete search history.

(56) References Cited

U.S. PATENT DOCUMENTS

| 5,316,202 A | 5/1994 | Murray et al. | |
| 7,086,831 B2 * | 8/2006 | Harper | F01D 5/26 |
| | | | 415/209.3 |

(Continued)

FOREIGN PATENT DOCUMENTS

| EP | 1493901 A1 | 1/2005 |
| FR | 2989414 A1 | 10/2013 |

(Continued)

OTHER PUBLICATIONS

Machine translation of FR 2989414, date unknown.*
Search Report dated Feb. 5, 2015 from European Patent Appl. No. 14179301.8.

*Primary Examiner* — Jeffry H Aftergut
(74) *Attorney, Agent, or Firm* — James E. Walton

(57) ABSTRACT

The present application relates to a method for assembling a stator stage of a turbomachine, the stage having an inner ring, an outer ring, and vanes extending radially between the inner ring and the outer ring. The method includes at least the following essential step: applying at least one inflatable bladder against at least one opening between a vane and one of the inner ring and the outer ring on that face of the ring which is opposite the face for application of a sealing material, so as to form one or more retention surfaces for the sealing material. The present application also relates to an assembly device designed for implementing the method.

20 Claims, 2 Drawing Sheets

(51) Int. Cl.
    *B29C 65/48*     (2006.01)
    *F01D 5/00*     (2006.01)
    *B29L 31/00*     (2006.01)

(56) References Cited

U.S. PATENT DOCUMENTS

2002/0078563 A1* 6/2002 McFarland ............. B25B 27/00
    29/888
2010/0236332 A1* 9/2010 Vontell .................. F01D 25/285
    73/756

FOREIGN PATENT DOCUMENTS

| | | | |
|---|---|---|---|
| FR | FR-2989414 A1 * | 10/2013 | |
| FR | 2995554 A1 | 3/2014 | |
| GB | 2400415 A | 10/2004 | |

\* cited by examiner

APPLICATION OF A CONNECTION JOINT TO A STATOR STAGE BY MEANS OF INFLATABLE BLADDERS

This application claims priority under 35 U.S.C. §119 to European Patent Application No. 14179301.8, filed 31 Jul. 2014, titled "Application of a Connection Joint to a Stator Stage by Means of Inflatable Bladders," which is incorporated herein by reference for all purposes.

BACKGROUND

1. Field of the Application

The present application relates to assembling turbines, in particular turbomachines of aero engines. More particularly, the present application relates to assembling a stator stage of a turbine.

2. Description of Related Art

It is known to assemble a stator stage of a turbomachine using a method of sealing the vanes to the inner ring of the stator. The sealing is generally effected by filling a paste-like material, in particular a silicone resin, in an opening between each one of the vanes and the inner ring of the stator so as to form a connection joint. The method generally comprises a step of finishing the joint, designed to minimize the disturbance to the flow of air passing through the stage. The method is however onerous if a high-quality connection joint is to be ensured.

The document of patent FR 2989414 A1 discloses the use of a tooling designed for implementing such an assembly method. The tooling comprises counter-moulds installed one by one between the vanes and designed to cover in a sealing manner the openings designed to receive the sealing material. This tooling is interesting in that it is thereby possible to make the joint more easily. The assembly, in particular the mounting and the removing of the counter-moulds, is however time-consuming. Moreover, this tooling has to be adapted to each stator architecture, essentially depending on the space between the vanes and on the profile of said vanes.

Although great strides have been made in the area of assembling stator stages of axial turbomachine compressors, many shortcomings remain.

DETAILED DESCRIPTION OF THE PREFERRED EMBODIMENT

Figure 1:
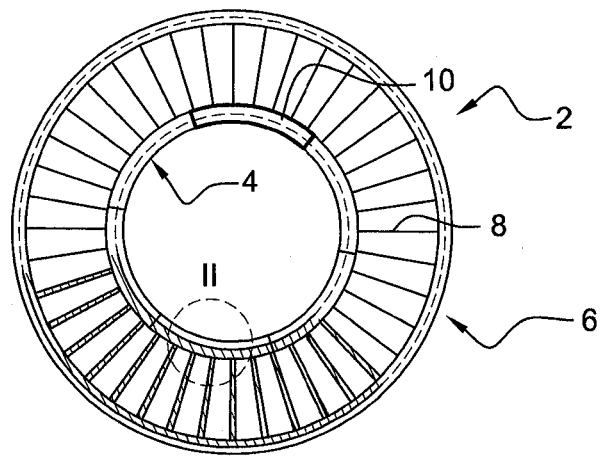
FIG. 1 shows a simplified view in the axial direction of a stator stage of a turbomachine.

The present application proposes a solution which remedies at least one of the abovementioned drawbacks of the prior art. More particularly, the present application aims to propose an efficient assembly solution.

The present application relates to a method for assembling a stator stage of a turbomachine, the stage comprising an inner ring, an outer ring and vanes extending radially between the inner ring and outer ring, the method comprising the following steps: (a) positioning at least one of the vanes and/or at least one part of one of the inner ring and outer ring, such that said or each one of said vanes passes through an opening, respectively, of said ring or ring part; and (c) applying a sealing material between the vane, or each one of the vanes, and the corresponding opening, on one face of the ring or ring part, so as to form a connection joint between the vane, or each one of the vanes, and the ring or ring part; noteworthy in that the method comprises the following intermediate step: (b) applying at least one inflatable bladder against the opening or each one of the openings, on that face of the ring or ring part which is opposite the face for application of the sealing material, so as to form one or more retention surfaces of said sealing material. The sealing material is essentially a resin or an elastomer.

A bladder is essentially a pouch made of an extensible, airtight material.

According to one advantageous form of the present application, step (b) of the method comprises the application of multiple bladders connected to one another aeraulically such that they can be inflated at the same time, preferentially from a central air distributor.

According to one advantageous form of the present application, the bladders are connected to one another via a common support able to extend along the ring or ring part receiving the one or more connection joints.

According to one advantageous form of the present application, step (b) comprises applying the bladder or at least one of the bladders between two adjacent vanes, respectively, said or each one of said bladders then being inflated so as to press against the two vanes and the ring between the two vanes.

According to one advantageous form of the present application, step (a) also comprises placing the other of the inner ring and outer ring, the bladder or each one of the bladders being inflated so as to also press on said other ring, between the two vanes.

According to one advantageous form of the present application, step (b) comprises applying one of the bladders on either side of the or at least one of the vanes so as to form two retention surfaces at the periphery of said vane or of each one of said vanes, said surfaces being contiguous at the front and/or at the rear of said vane.

According to one advantageous form of the present application, the two retention surfaces at the periphery of the vane or of each one of the vanes are contiguous at the front and at the rear of said vane so as to cover all of the corresponding opening.

According to one advantageous form of the present application, the retention surfaces may be contiguous over a length, in a substantially axial direction, of greater than 20% of the width of the vanes, preferentially greater than 50%.

According to one advantageous form of the present application, the contiguous surfaces extend essentially in the axial direction of the stator.

According to one advantageous form of the present application, the or each one of the retention surfaces of the one or more bladders against the opening or against each one of the openings forms a connection radius between 0.2 mm and 10 mm, preferentially between 2 mm and 5 mm.

According to one advantageous form of the present application, step (c) is followed by a step of filling abradable material in and/or on the inner ring using the sealing material used in step (b) or using another type of material, said sealing material and material of another type being preferentially silicone-based.

The present application also relates to a device for assembling a stator stage of a turbomachine, the stator comprising an inner ring or an inner ring part, an outer ring or an outer ring part and vanes which extend radially between the rings or inner and outer ring parts and are mounted through openings in the rings or parts of a ring, noteworthy in that it comprises multiple inflatable bladders configured to be applied between adjacent vanes and against openings then inflated to form one or more retention surfaces of a sealing material when it is applied between the vanes and the openings.

According to one advantageous form of the present application, the bladders are of parallelepipedal average shape, preferentially curved along their base so as to facilitate their insertion between two vanes.

According to one advantageous form of the present application, the device comprises an elongate support, preferentially in the form of a torus or a portion of a torus, connecting the inflatable bladders, said support being designed to be connected to a source of pressurized gas and to distribute said gas in each one of the bladders.

According to one advantageous form of the present application, the device comprises a jig able to support the elongate support, said jig being made so as to be fixed on a ring or a ring part.

According to one advantageous form of the present application, the jig comprises means for rapid fixing to the ring or to the ring part, preferentially spring-loaded and/or snap-fitting fixing means.

According to another advantageous form of the present application, the device comprises a central air distribution manifold, said manifold being connected aeraulically to each one of the inflatable bladders.

According to one advantageous form of the present application, the device comprises multiple jigs configured to support each one of the bladders independently.

According to one or another of the advantageous forms of the present application, the device is configured to be mounted on an assembly table.

The present application also relates to a table for assembling a stator stage of a turbomachine, noteworthy in that it comprises an assembly device according to the present application.

According to one advantageous form of the present application, the assembly table comprises an assembly surface, which is preferentially horizontal, the device being arranged on the assembly surface.

According to one advantageous form of the present application, the assembly device is configured such that it can be applied to the stator stage by means of a relative movement between said stage and the table in the axial direction of the stator.

The measures of the present application are of interest in that they permit efficient implementation of the method of sealing the vanes of the stator stage. Indeed, the inflatable bladders are able to cover—automatically and in a sealing manner—all of the spaces designed to be filled with sealing material, which speeds up assembly and harmonizes the quality between the various connection joints.

FIG. 1 is a simplified view in the axial direction of a stator stage 2 of a turbomachine. The stage comprises an inner ring 4, an outer ring 6 and vanes 8 extending radially between the inner ring 4 and the outer ring 6. The inner ring 4 and the outer ring 6 may be made by an assembly of ring parts. By way of example, the image shows one ring part 10 of the inner ring 4 of the stage 2 in question. The outer ring 6 may also be assembled from ring parts forming for example segments. The vanes 8 of the stage are assembled with one of the rings 4 and 6 using a sealing resin or polymer. In the embodiment presented below, only the inner ring 4 or those ring parts 10 of which form it is/are assembled with the vanes 8 using a sealing material, which in no way limits the present application.

Figure 2:
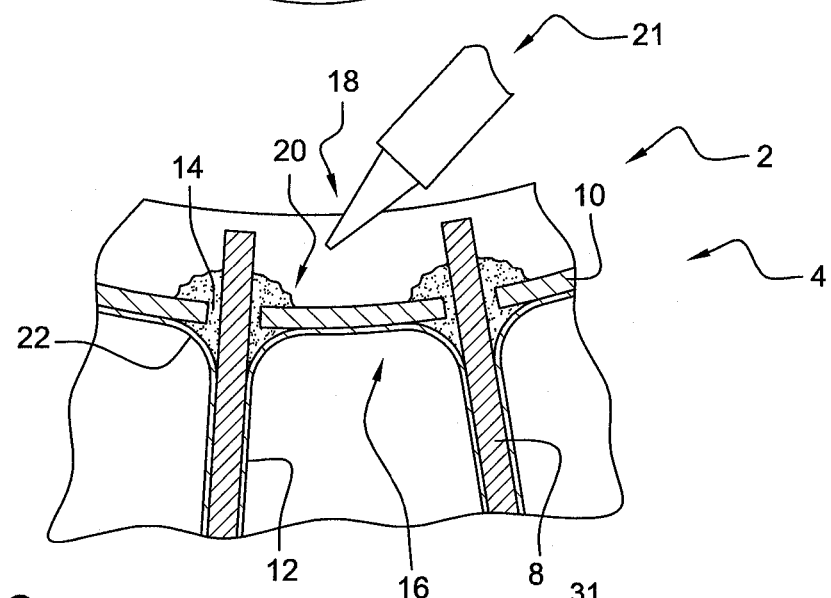
FIG. 2 is a view in radial section of a portion of the stator stage of FIG. 1 equipped with an assembly device according to the present application.

FIG. 2 is a view in radial section of a portion II of the stator stage 2 equipped with an assembly device according to the present application. However, all that is shown of the device are bladders 12 in the inflated state. Such a stage 2 is assembled using an assembly method according to the present application and comprising the following steps: (a) positioning at least one of the vanes 8 and/or at least one part 10 of one of the inner ring 4 and outer ring, such that said or each one of said vanes 8 passes through a respective opening 14 of said ring 4 or ring part 10; (b) applying at least one inflatable bladder 12 against the opening 14, or each one of the openings 14, on that face 16 of the ring 4 or ring part 10 which is opposite the face 18 for application of a sealing material 20, so as to form one or more retention surfaces 22 of said sealing material 20. A bladder 12 is essentially a pouch made of an extensible, airtight material; the or each one of the bladders 12 can be inflated so as to press against two adjacent vanes 8 in addition to its application against the face 16 of the ring 4 and the opening or openings 14; and (c) applying a sealing material 20 between the vane 8 and the opening 14 or each one of the vanes 8 and the corresponding opening 14, on the face 18 of the ring 4 or ring part 10, so as to form a connection joint between the vane 8, or each one of the vanes 8, and the ring 4 or ring part 10. The connection joint ensures the sealing, it can also ensure airtightness. In one particular mode of the present application, step (b) of the method may comprise the application of multiple bladders 12 designed to be inflated at the same time; step (c) may also be followed by a step of filling abradable material (not shown) in and/or on the inner ring 4 using the sealing material 20 used as a connection joint or using another type of material, said sealing material 20 and material of another type being preferentially silicone-based. The sealing material 20 and/or the abradable material may be applied manually or in an automated manner. The image shows a nozzle 21 for applying the sealing material 20.

Figure 3:
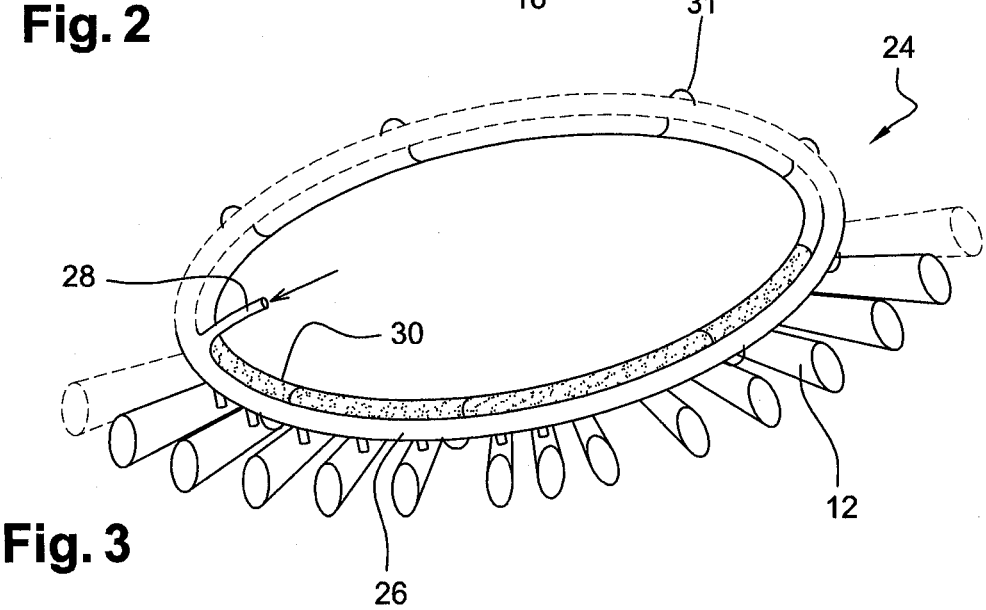
FIG. 3 is a simplified view of the assembly device according to the present application and in a particular embodiment.

FIG. 3 is a simplified view of a device 24 for assembling a stator stage (not shown) of a turbomachine according to the present application and in a particular embodiment. This device 24 is designed to be used for mounting the vanes on the one or more rings of the stator stage as seen in relation with the preceding figure. The device 24 comprises multiple inflatable bladders 12 configured to be applied between the adjacent vanes and against openings, as seen in relation with FIG. 2, then inflated to form one or more retention surfaces of the sealing material when it is applied between the vanes and the openings. The bladders 12 may be of right parallelepipedal average shape, it will be shown below how bladders of curved shape can facilitate their insertion between the vanes which may be highly curved in a radial plane. The bladders 12 are designed to be inflated at the same time, it being possible to carry out this inflation from a central distributor for air or for another gas. In this embodiment (not shown), the device may comprise a central gas distribution manifold, each one of the inflatable bladders then being connected independently to this manifold. As an alternative and as represented in the image, the bladders 12 may be connected to one another aeraulically to create a passage for air or for another gas between each bladder 12; this connection can be created by an elongate common support 26 which is in the shape of a torus or is a portion of a torus and is connected by a duct 28 to a source of pressurized gas. The common support 26 can be configured so as to be supported along the ring or the ring part receiving the one or more connection joint(s). So as to facilitate this support, the device may also comprise a jig 30 configured so as to hold the elongate support 26 on the ring, wherein this jig 30 may be made so as to be fixed on the ring or a ring part for example with rapid fixing means of the spring-loaded and/or snap-fitting fixing type. The image shows, schematically and by way of example, support elements 31 and rapid fixing means 33 for the jig 30. As an alternative, the assembly device may comprise multiple jigs configured to support each one of the bladders independently from one another. An assembly table (not shown) according to the present application may comprise an assembly surface, which is for example horizontal and on which is arranged an assembly device configured to receive the stator stage by means of a relative movement between the stator and the table in a vertical direction corresponding to the axial direction of the stator. In this disposition, the bladders are oriented upwards above the assembly table. As an alternative, the assembly surface is able to receive the stator stage, and the assembly device 24, for example that presented in the image, is configured such that it can be applied to the stator stage.

Figure 4:
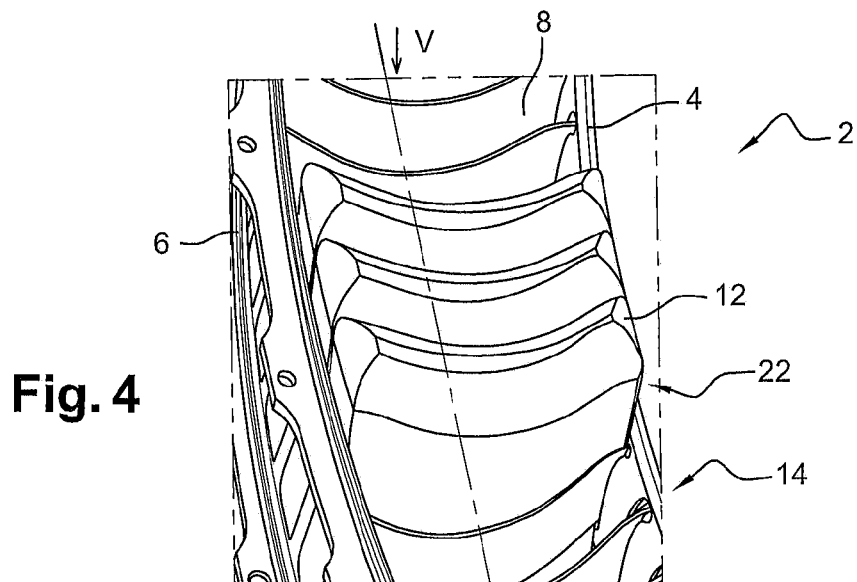
FIG. 4 is a perspective view of the stator stage of FIG. 2 equipped with inflatable bladders according to one advantageous form of the present application.

FIG. 4 is a perspective view of the stator stage 2 equipped with inflatable bladders 12 with the aim of creating the assembly in question. The bladders 12 are presented in an advantageous embodiment of the present application, in that the assembly method, more precisely its first step, comprises positioning at least one vane 8, in this case the vanes 8, on the outer ring 6 shown on the left of the image. The vanes 8 are also assembled on the inner ring 4 on the right of the image, the bladders 12 when inflated then having, as support, each one of the inner ring 4 and outer ring 6; the bladders 12, as they inflate, also press between two adjacent vanes 8. At the bottom of the image are shown openings 14 between each one of the vanes 8 and one of the rings, in this case the inner ring 4, these openings 14 being designed to receive the sealing material to form the connection joints. The inflated bladders 12 are able to form a retention surface 22 against the openings 14, at the periphery of the vanes 8. The retention surfaces 22 may be contiguous at the front and/or at the rear, above and/or below the stator in the image, of each one of the vanes 8. In an alternative embodiment (not shown), the jig seen in relation with FIG. 3 may comprise radial bearing faces of the bladders 12, wherein these bearing faces can be situated between the inner ring 4 and outer ring 6 and replace the bearing points created by one of the inner ring 4 and outer ring 6 of the stator stage 2.

Figure 5:
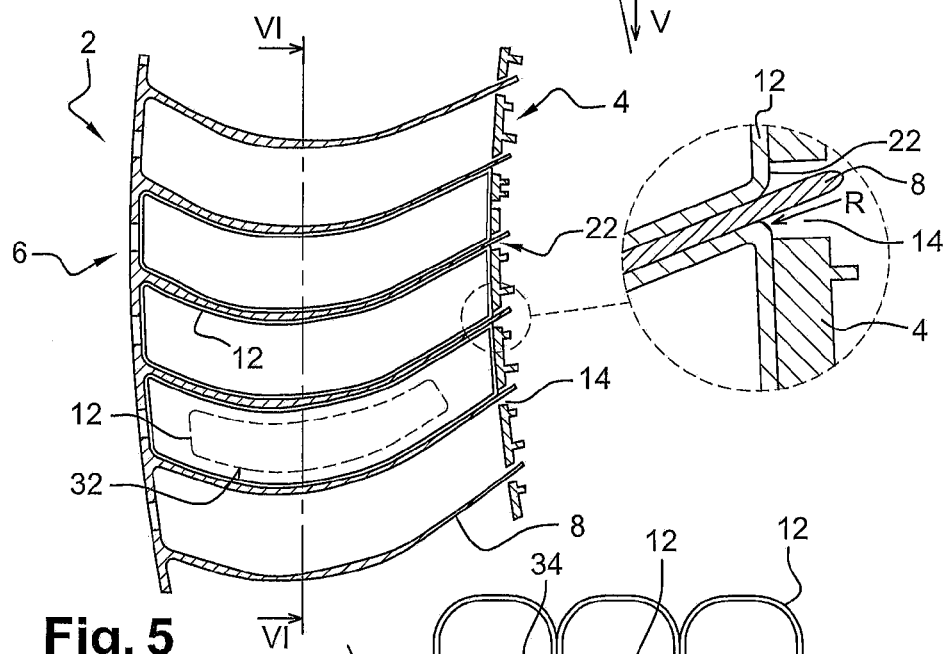
FIG. 5 is a view in radial section of the stator stage of FIG. 4.

FIG. 5 is a view in radial section of the stator stage 2 according to the advantageous form of the present application seen in relation with the preceding figure. Shown are the bladders 12 bearing on both the inner ring 4 and outer ring 6 and applied on either side of the vanes 8. Shown are the retention surfaces 22 of the bladders 12 against the openings 14, wherein the enlarged portion of the figure on the right of the main image shows the connection radius "R" formed by these retention surfaces 22. The connection radius "R" can be between 0.2 mm and 10 mm, preferentially between 2 mm and 5 mm. Also shown with precision in the enlarged portion are the ring 4, the bladder 12 in the inflated state, and the vane 8 passing through the opening 14. The main image shows, in a dashed line, a bladder 12 in the non-inflated or partially-inflated state, the bladder is curved along its base 32 so as to facilitate its insertion between two vanes 8 of the stator 2. The curvature of the bladders 12 in the non-inflated or partially-inflated state can favourably be substantially similar to the curvature of the vanes 8 in their extent between the rings 4 and 6. The average difference of the radius of curvature, between the bladders 12 in the non-inflated or partially-inflated state and the vanes, can be less than 10%.

Figure 6:
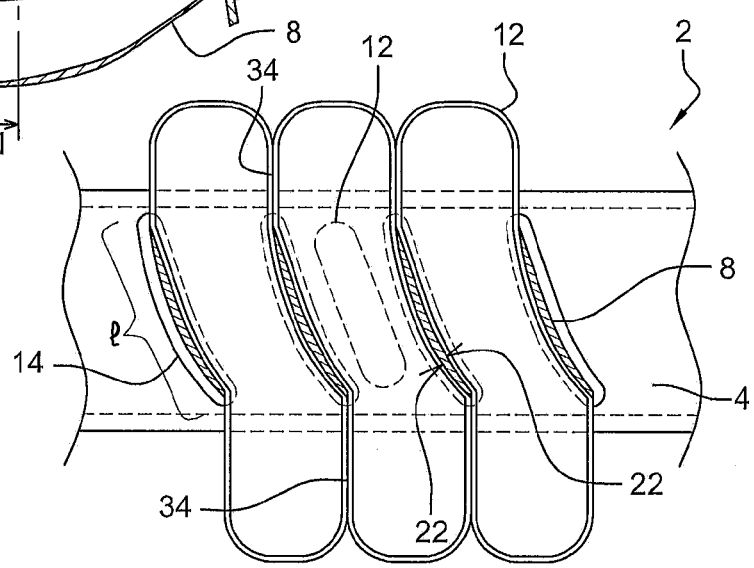
FIG. 6 is a view in tangential section of the stator stage of FIG. 4.

FIG. 6 is a view in tangential section of the stator stage 2 according to the advantageous form of the present application, seen in relation with FIGS. 4 and 5. The inner ring 4 is shown in the background of the image. The openings 14 covered by the bladders 12 are shown in dashed lines at the periphery of each vane 8. A non-inflated or partially-inflated bladder 12 is shown in dashed lines between two vanes 8. Two retention surfaces 22, made by the bladders 12, are visible at the periphery of each one of the vanes 8, these two surfaces being contiguous at the front of the vanes 8 as well as at the rear of the vanes so as to cover all of the corresponding opening 14. Of note is the extension of the inflated bladders 12 in the substantially axial direction of the stator stage 2, wherein the contiguous portions 34 of the retention surfaces of the bladders 12 can extend in the essentially axial direction of the stator stage 2. This measure is of interest in that it facilitates the creation of a high-quality connection joint in particular at the front and at the rear of each one of the vanes 8. Indeed, the creation of the seal is facilitated by the balance of forces between the bearing surfaces, created by these contiguous portions 34, at the front or at the rear and on either side of the vanes 8. The contiguous portions 34 of the retention surfaces may be contiguous over a length greater than 20% of the width "l" of the vanes, preferentially 50%.

I claim:

1. A method for assembling a stator stage of a turbomachine, the stage having an inner ring, an outer ring, and vanes extending radially between the inner ring and outer ring, at least one of the rings exhibiting an opening, the method comprising:
   (a) positioning at least one of the vanes and the ring exhibiting the opening, such that said vane passes through the opening and raises radially from the opening; and
   (c) applying a sealing material between the vane and the corresponding opening, on a face of said ring exhibiting the opening, so as to form a connection joint between the vane and the ring opening; and
   an intermediate step (b) of applying at least one inflatable bladder against the opening on a face of the ring, the face being radially opposite to the face for application of the sealing material, so as to form one or more retention surfaces of said sealing material.

2. The method in accordance with claim 1, wherein the ring exhibiting the opening is the inner ring.

3. The method in accordance with claim 1, wherein the ring exhibiting the opening is made of angular sectors which exhibit an opening row.

4. The method in accordance with claim 1, wherein step (b) comprises:
   the application of multiple bladders connected to one another aeraulically such that they can be inflated at the same time.

5. The method in accordance with claim 4, wherein the multiple bladders are inflated at the same time from a central air distributor.

6. The method in accordance with claim 4, wherein the bladders are connected to one another via a common support able to extend along the ring receiving the connection joint.

7. The method in accordance with claim 1, wherein step (b) comprises:
applying the bladder between two adjacent vanes, the bladder then being inflated, so as to press against the two adjacent vanes and against the ring exhibiting the opening, between the adjacent vanes.

8. The method in accordance with claim 7, wherein the adjacent vanes form a flow path between them which becomes closed by the bladder when the bladder is inflated.

9. The method in accordance with claim 7, wherein step (a) also comprises:
placing the other of the inner ring and outer ring, the bladder being inflated, so as to also press on said other ring, between the two adjacent vanes.

10. The method in accordance with claim 9, wherein the other of the inner ring and outer ring is the outer ring.

11. The method in accordance with claim 1, wherein step (b) comprises:
applying a bladder on either side of the at least one vane, so as to form two retention surfaces at the periphery of the vane, the surfaces being contiguous at the leading edge and at the trailing edge of the vane.

12. The method in accordance with claim 11, wherein the two retention surfaces at the periphery of the vane are contiguous at the leading edge and at the trailing edge of the vane, so as to cover all of the corresponding opening.

13. The method in accordance with claim 1, wherein the retention surfaces of the bladder against the opening forms a connection radius between 0.2 mm and 10 mm.

14. The method in accordance with claim 1, wherein step (c) is followed by a step of filling abradable material in the inner ring in order to form an inner annular seal inside the inner ring, the sealing abradable material being silicone-based.

15. A device for assembling a stator stage of a turbomachine, the stator having an inner ring, an outer ring, and vanes which extend radially between the rings, at least one of the rings comprising an opening row, the vanes being mounted through openings of the opening row, the device comprising:
multiple inflatable bladders configured to be applied between adjacent vanes and against openings, where the bladders are inflated to form one or more retention surfaces of a sealing material when it is applied between the vanes and against the openings.

16. The device in accordance with claim 15, further comprising:
an elongate support connecting the inflatable bladders, the support being configured to be connected to a source of pressurized gas and to distribute the gas into each one of the bladders, the elongate support forming a torus.

17. The device in accordance with claim 16, further comprising:
a jig able to support the elongate support, the jig being made so as to be fixed on a ring.

18. The device in accordance with claim 17, wherein the jig comprises:
elements for rapid fixing to the ring, the elements being at least one of the group consisting of a spring and a snap-fitting.

19. A table for assembling a stator stage of a turbomachine, the stator having an inner ring, an outer ring, and vanes which extend radially between the rings, at least one of the rings having an opening row, the vanes being mounted through openings of the opening row, the table comprising:
a generally horizontal assembly surface on which the stator is mounted; and
an assembly device comprising:
multiple inflatable bladders configured to be applied between adjacent vanes and against openings, the bladders being inflated to form one or more retention surfaces of a sealing material when the bladders are applied between the vanes and against the openings.

20. The table in accordance with claim 19, wherein the assembly device is configured so as to be applied to the stator stage via a relative movement between the stage and the table in the axial direction of the stator.

* * * * *